US011006340B2

United States Patent
Lindoff et al.

(10) Patent No.: US 11,006,340 B2
(45) Date of Patent: May 11, 2021

(54) METHODS OF HANDLING INTER-MODULATION PRODUCTS INTERFERENCE AT A NETWORK NODE OR AT A CO-LOCATED NETWORK NODE SITE

(71) Applicant: Telefonaktiebolaget LM Ericsson (publ), Stockholm (SE)

(72) Inventors: Bengt Lindoff, Bjarred (SE); Bo Hagerman, Morristown, NJ (US); David Eriksson, Knivsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 159 days.

(21) Appl. No.: 16/085,852

(22) PCT Filed: Mar. 18, 2016

(86) PCT No.: PCT/EP2016/055996
§ 371 (c)(1),
(2) Date: Sep. 17, 2018

(87) PCT Pub. No.: WO2017/157464
PCT Pub. Date: Sep. 21, 2017

(65) Prior Publication Data
US 2019/0104457 A1  Apr. 4, 2019

(51) Int. Cl.
*H04W 36/24* (2009.01)
*H04B 1/525* (2015.01)
(Continued)

(52) U.S. Cl.
CPC ............ *H04W 36/24* (2013.01); *H04B 1/525* (2013.01); *H04W 36/20* (2013.01); *H04W 36/38* (2013.01);
(Continued)

(58) Field of Classification Search
CPC ..... H04W 36/24; H04W 36/20; H04W 36/38; H04W 72/0453; H04W 72/082;
(Continued)

(56) References Cited

U.S. PATENT DOCUMENTS

2012/0236736 A1*  9/2012  Frank .................... H04W 24/04
                                                       370/252
2013/0044621 A1   2/2013  Jung et al.
(Continued)

FOREIGN PATENT DOCUMENTS

WO     2012128886 A1    9/2012
WO     2016082896 A1    6/2016

OTHER PUBLICATIONS

PCT International Search Report, dated Nov. 24, 2016, in connection with International Application No. PCT/EP2016/055996, all pages.

(Continued)

*Primary Examiner* — Shailendra Kumar
(74) *Attorney, Agent, or Firm* — Patent Portfolio Builders, PLLC (57) ABSTRACT

An approach of handling interference caused by intermodulation in a network node for wireless communication capable of communication with a set of stations for wireless communication is disclosed. The stations are wireless transceiver devices and communication from the network node to any of the stations is considered to be downlink communication performed on a downlink carrier in a downlink carrier frequency band and communication from any of the stations is considered to be uplink communication performed on an uplink carrier in an uplink carrier frequency band. The method comprises, when an interference level indicates probable inter-modulation interference, scheduling uplink transmission grants for a plurality of stations of a subset of the stations within a time interval, such that scheduling
(Continued)

outside the time interval is reduced. The uplink transmission grants are valid for the time interval, wherein the scheduling uplink transmission grants is performed by adapting a schedule for at least one station of the plurality of stations of the subset of the stations to fall within the time interval. The method further comprises transmitting the uplink transmission grant to the plurality of stations of the subset of stations, assigning limited transmissions on the downlink carrier frequency band at the time interval such that inter-modulation interference is reduced on the uplink carrier frequency band during the time interval, and assigning transmissions on the downlink carrier frequency band outside the time interval with less limitations than during the time interval. The approach comprises methods, network nodes, computer programs and network node sites.

25 Claims, 7 Drawing Sheets

(51) Int. Cl.

| | | |
|---|---|---|
| *H04W 36/20* | (2009.01) | |
| *H04W 36/38* | (2009.01) | |
| *H04W 72/04* | (2009.01) | |
| *H04W 72/08* | (2009.01) | |
| *H04W 72/12* | (2009.01) | |
| *H04W 72/14* | (2009.01) | |
| *H04W 74/02* | (2009.01) | |
| *H04W 88/08* | (2009.01) | |
| *H04L 5/14* | (2006.01) | |
| *H04W 36/00* | (2009.01) | |

(52) U.S. Cl.
CPC ..... *H04W 72/0453* (2013.01); *H04W 72/082* (2013.01); *H04W 72/1231* (2013.01); *H04W 72/1257* (2013.01); *H04W 72/1263* (2013.01); *H04W 72/14* (2013.01); *H04W 74/02* (2013.01); *H04W 88/08* (2013.01); *H04L 5/1461* (2013.01); *H04W 36/00837* (2018.08); *H04W 72/1273* (2013.01)

(58) Field of Classification Search
CPC . H04W 72/1263; H04W 72/14; H04W 74/02; H04W 72/1231; H04W 72/1257; H04W 88/08; H04W 72/1273; H04W 36/00837; H04B 1/525; H04L 5/1461
See application file for complete search history.

(56) References Cited

U.S. PATENT DOCUMENTS

| | | | |
|---|---|---|---|
| 2014/0036736 | A1 | 2/2014 | Wyville |
| 2015/0016387 | A1* | 1/2015 | Elmdahl ............... H04W 16/04 370/329 |
| 2016/0088531 | A1* | 3/2016 | Rashid ................. H04W 16/14 455/436 |
| 2017/0280454 | A1* | 9/2017 | Kusashima ........... H04L 5/0055 |
| 2019/0037584 | A1* | 1/2019 | Park ................. H04W 72/1268 |

OTHER PUBLICATIONS

PCT Written Opinion, dated Nov. 24, 2016, in connection with International Application No. PCT/EP2016/055996, all pages.
3GPP TRR 37.808 V12.0.0, Sep. 2013, 3rd Generation Partnership Project; Technical Specification Group Radio Access Network; Passive intermodulation (PIM) handling for Base Stations (BS), Release 12, 27 pages.

* cited by examiner

Fig. 12

METHODS OF HANDLING INTER-MODULATION PRODUCTS INTERFERENCE AT A NETWORK NODE OR AT A CO-LOCATED NETWORK NODE SITE

TECHNICAL FIELD

The present invention generally relates to methods for a network node, such a network node and a network node site, and a computer program for implementing any of the methods. In particular, the present invention relates to handling interference caused by inter-modulation.

BACKGROUND

In wireless communication systems, interference by radio frequency (RF) transmitters for RF communication systems may become an issue.

The purpose of a transmitter in a digital wireless communication system is to convert a digital low-frequency baseband signal into an RF signal while preserving the modulation, and thereby the baseband information. In a full duplex system, a radio receives and transmits information simultaneously, which may be performed according to frequency duplex division (FDD), i.e. the radio transmits on one frequency and receives on another frequency. This means that, despite the fact that receive (RX) and transmit (TX) signals are spaced in frequency by a duplex distance, distortion products caused by nonlinearities in the transmitter may fall into the receive band and raise the over-all receiver noise figure, as well as discomply with a transmit spectrum mask. In order to reduce this effect, external cavity filters may be used in radio base stations (RBS) to filter out unwanted components outside wanted transmission band. However, intermodulation products caused by multiple transmitted signals, e.g. own TX signal in combination with an interferer signal, may also position unwanted tones in the receive band and thus degrade the receiver signal-to-noise-ratio (SNR). These unwanted tones are not possible to filter out by frequency filtering and they are thus to be handled by the receiver.

In a multi operator FDD RBS site solution, each operator uses a unique paired spectrum and the spectrum parts thus become separated in frequency not to interfere with each other's operations. There is no joint scheduling required among the operators, resulting in that simultaneous transmissions may occur. However, due to non-linear effects caused by for instance excitation of ferromagnetic materials or other physical properties, e.g. metal oxidation, mechanical disruptions, etc., passive intermodulation (PIM) products may be reflected back to or within the RBS site and fall into one of the operator's receive band and cause desensitization. As a result, the created PIM products caused by the multi operator transmissions may result in lowered received uplink SNR for some scenarios. The problem may also arise in the case when the same operator uses two different carrier frequencies, e.g. operating in carrier aggregation setup, in any direction.

A normal operation to handle such problems would be to send a service technician to the RBS site to try to find the cause and replace or mend the causing element. However, such an operation may take a while, and there may be a not fully functioning RBS for a longer or shorter time. Approaches for compensating at the receiver are also contemplated. For example, US 2014/036736 discloses an approach for compensation for Passive Intermodulation (PIM) distortion in a receiver. A main receiver receives a radio frequency receive signal and outputs a main receiver output signal. In order to compensate for PIM distortion, a tunable non-linear circuit generates an Intermodulation Products (IMP) signal that includes a number of IMPs as a function of a signal that is indicative of the radio frequency transmit signal. An auxiliary receiver receives the IMP signal and outputs an auxiliary receiver output signal that includes only a subset of the IMPs that fall within a passband of the main receiver. The auxiliary receiver output signal is adaptively filtered to provide a PIM estimate signal, which is then subtracted from the main receiver output signal to provide a compensated output signal.

In the case when two FDD downlink bands are separated by the same frequency distance as the duplex distance for one of the FDD receiver frequencies, third order PIM products may become collocated within a receive band without the possibility to be suppressed by filtering as discussed above. As a result, the noise level of the affected receiver will increase and lower received SNR in the uplink.

Figure 1:
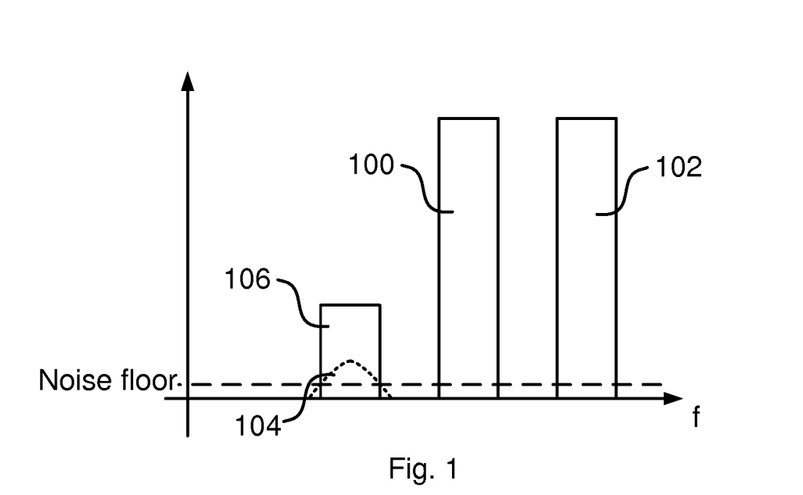
FIG. 1 schematically illustrates how inter-modulation issues may degrade a signal.
Figure 2:
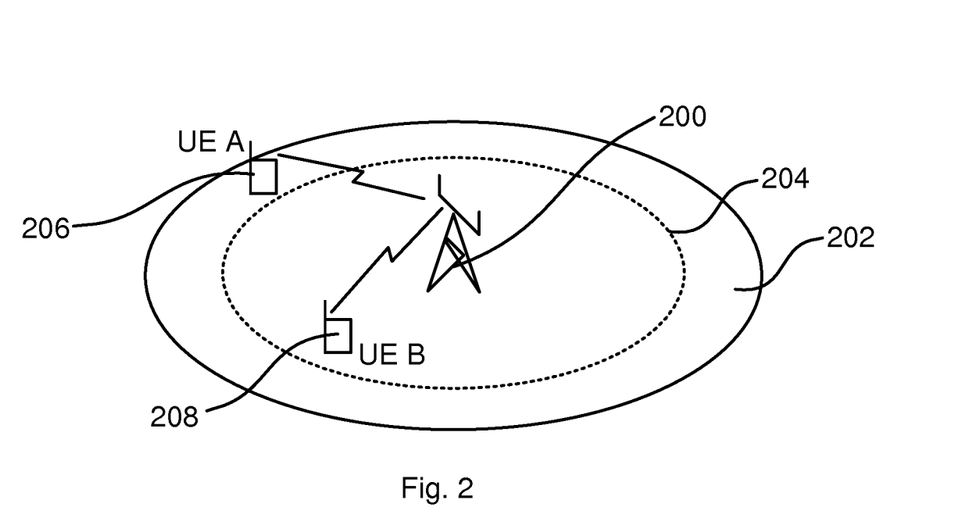
FIG. 2 schematically illustrates a base station operating a cell and how inter-modulation degradation may limit the range of the base station.

An example is illustrated in FIG. 1 where two transmitted signals 100, 102, for example 3GPP frequency band 29 and band 17, from the same RBS give rise to a PIM product 104, in this case due third order intermodulation, i.e. at 2·f1−f2, where f1 is the frequency of transmission in B17 and f2 is the transmission frequency in band 29, falling into the receive band 106 of band 17. As a result, in the band 17 the receiver will lower its sensitivity and face reduced coverage. Continuing this example with reference to FIG. 2, a base station 200 is operating a cell 202. The lowered sensitivity will decrease the possible coverage of the cell to a limited coverage 204. This could potentially lead to dropped connections or limited application coverage as illustrated by UE A 206 in FIG. 2, while for UEs closer to the network node 200, e.g. UE B 208, the communication may still work. This may lead to the operator missing traffic (to be billed) and/or less satisfaction by subscribers.

This may become more and more of a problem the more bands that are available, since with the more bands there will be larger risks for co-sited RBSs for different operators, which may create PIM affecting any of the operators' receive bands. For the sake of brevity and easier understanding, the issue has been demonstrated above where inter-modulation is caused by two frequencies, but the similar effects may arise from further used frequencies, and used frequencies inter-modulating with inter-modulation products, and so on. That is, the more frequencies used at a network node site, the more likely is it that an inter-modulation product affects a receive band.

It is therefore a desire to handle such situations.

SUMMARY

The invention is based on the inventors' realization that handling inter-modulation interference by reducing transmissions by one or more network nodes when the affected communication is to occur may decrease system performance. The inventors have proposed an approach for reducing the number of occasions where reduced transmissions are applied.

According to a first aspect, there is provided a method of handling interference caused by inter-modulation in a network node for wireless communication capable of communication with a set of stations for wireless communication. The stations are wireless transceiver devices and communication from the network node to any of the stations is considered to be downlink communication performed on a downlink carrier in a downlink carrier frequency band and communication from any of the stations is considered to be uplink communication performed on an uplink carrier in an uplink carrier frequency band. The method comprises, when an interference level indicates probable inter-modulation interference, scheduling uplink transmission grants for a plurality of stations of a subset of the stations within a time interval, such that scheduling outside the time interval is reduced. The uplink transmission grants are valid for the time interval, wherein the scheduling uplink transmission grants is performed by adapting a schedule for at least one station of the plurality of stations of the subset of the stations to fall within the time interval. The method further comprises transmitting the uplink transmission grant to the plurality of stations of the subset of stations, assigning limited transmissions on the downlink carrier frequency band at the time interval such that inter-modulation interference is reduced on the uplink carrier frequency band during the time interval, and assigning transmissions on the downlink carrier frequency band outside the time interval with less limitations than during the time interval.

The method may further comprise determining the time interval to be such that the uplink transmissions occur at the same interval as a handover triggered random access channel, RACH, is expected to occur. The method may comprise receiving, over a core network associated with the network node, signalling from a network node of a source cell about an expected time for the handover triggered RACH. The method may comprise determining from the assigning of limited transmissions on the downlink carrier whether the expected time for the handover triggered RACH falls within the time interval, and sending, over the core network, a request to adapt timing of a handover command to the network node of the source cell if the expected time for the handover triggered RACH falls outside the time interval such that the handover triggered RACH falls within the time interval.

At least one of the uplink transmission grants may be a RACH preamble assignment and the uplink transmissions may comprise RACH transmissions.

At least one of the uplink transmission grants may be a RACH request.

The scheduling of the uplink transmission grants by adapting the schedule may comprise delaying at least one paging of a station.

The method may comprise setting a time between sending the uplink transmission grant and the time when the time interval commences.

The method may comprise setting a duration of the time interval.

The method may comprise measuring times between sending the uplink transmission grants and the corresponding uplink transmissions, forming statistics on the measured times, and estimating a suitable time for commencing the time interval and/or duration of the time interval based on the statistics such that the uplink transmissions are likely to fall within the time interval, wherein the setting of the time when the time interval commences and/or of the duration of the time interval is based on the estimate.

The method may comprise receiving the uplink transmissions from the plurality of stations of the subset of the stations during the time interval.

According to a second aspect, there is provided a network node for wireless communication capable of communication with a set of stations for wireless communication. The stations are wireless transceiver devices and communication from the network node to any of the stations is considered to be downlink communication performed on a downlink carrier in a downlink carrier frequency band and communication from any of the stations is considered to be uplink communication performed on an uplink carrier in an uplink carrier frequency band. The network node comprises a transceiver arranged to perform the uplink and downlink communications with the stations, and a transmission controller. The transmission controller is arranged to, when an interference level indicates probable inter-modulation interference, schedule uplink transmission grants for a plurality of stations of a subset of the stations within a time interval, such that scheduling outside the time interval is reduced, wherein the uplink transmission grants are valid for the time interval, by adapting a schedule for at least one station of the plurality of stations of the subset of the stations to fall within the time interval, cause the transceiver to transmit the uplink transmission grant to the plurality of stations of the subset of stations, assign limited transmissions on the downlink carrier frequency band at the time interval such that inter-modulation interference is reduced on the uplink carrier frequency band during the time interval, and assign transmissions on the downlink carrier frequency band outside the time interval with less limitations than during the time interval.

The transmission controller may be arranged to determine the time interval to be such that the uplink transmissions occur at the same interval as a handover triggered random access channel, RACH, is expected to occur. The transmission controller may be arranged to receive, over a core network associated with the network node, signalling from a network node of a source cell about an expected time for the handover triggered RACH. The transmission controller may be arranged to determine from the assignment of limited transmissions on the downlink carrier whether the expected time for the handover triggered RACH falls within the time interval, and send, over the core network, a request to adapt timing of a handover command to the network node of the source cell if the expected time for the handover triggered RACH falls outside the time interval such that the handover triggered RACH falls within the time interval.

At least one of the uplink transmission grants may be a RACH preamble assignment and the uplink transmissions may comprise RACH transmissions.

At least one of the uplink transmission grants may be a RACH request.

The transmission controller may be arranged to delay at least one paging of a station adapting schedule of uplink grants.

The transmission controller may be arranged to set a time between sending the uplink transmission grant and the time when the time interval commences.

The transmission controller may be arranged to set duration of the time interval.

The network node may comprise a timing estimator being arranged to measure times between sending the uplink transmission grants and the corresponding uplink transmissions, form statistics on the measured times, and estimate a suitable time for commencing the time interval and/or duration of the time interval based on the statistics such that the uplink transmissions are likely to fall within the time interval. The transmission controller may be arranged to set the time when the time interval commences and/or of the duration of the time interval based on the estimate.

According to a third aspect, there is provided a computer program comprising instructions which, when executed on a processor of a network node, causes the network node to perform the method according to the first aspect.

According to a fourth aspect, there is provided a network node site comprising co-located network nodes comprising a first network node and a second network node, each for wireless communication and capable of communication with a set of stations for wireless communication. The stations are wireless transceiver devices and communication from each of the network nodes to any of the respective stations is considered to be downlink communication performed on a downlink carrier frequency band and communication from any of the stations is considered to be uplink communication performed on an uplink carrier frequency band. At least one of the first and second network nodes is a network node according to the second aspect. The network node site comprises a network node site controller arranged to cause the transmission controller of the at least one of the first and second network nodes to assign limited transmissions on the downlink carrier frequency band at the time interval such that inter-modulation interference caused by respective network node for any of the network nodes is reduced on the uplink carrier frequency band during the time interval.

The co-located network nodes may share the network node site controller, wherein the network nodes may be arranged to exchange, via the network node site controller, information on interference levels which indicate the probable inter-modulation interference and time intervals for limited transmissions on downlink carrier frequencies.

To assign the limited transmissions on the downlink carrier frequency band performed by the first network node may comprise to enable only to transmit system information. The system information may comprise control channel signals, reference signal or synchronization signals, or any combination thereof.

To assign the limited transmissions on the downlink carrier frequency band performed by the first network node may comprise to enable to transmit at a lower power than nominal power.

The communication from any of the network nodes to any of the stations associated therewith may be performed also on a further downlink carrier frequency band, or communication from any of the stations associated therewith may also be performed on a further uplink carrier frequency band for carrier aggregation, wherein when the interference level indicates probable inter-modulation interference also for the further uplink carrier frequency band, the limited transmissions may be assigned on the downlink carrier frequency band of the one of the downlink carrier frequency bands that has a frequency relation to the one of the uplink carrier frequency bands on which the interference level indicated probable inter-modulation interference such that inter-modulation interference is reduced on that uplink carrier frequency band.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Methods of handling interference, a network, (NW), node, a NW node site and computer programs for the same are disclosed below. The interference on topic is caused by inter-modulation in a NW node, or NW node site comprising a plurality of co-located NW nodes, for wireless communication capable of frequency division duplex communication with a set of stations for wireless communication. A station in this context may for example be a user equipment, UE, a modem, a smartphone, a cellphone, a computer or, any electric or electronic device capable of wireless communication with a NW node. More and more items we previously knew as rather simple objects are now capable of this, which has, and will, provide for some of the great improvements in many fields, even outside the conventional telecommunication industry. Examples are sensors, actuators, machines, medical equipment, monitoring devices, etc. that has been enhanced by being able to wirelessly communicate with wireless nodes of different wireless communication systems.

In this disclosure below, embodiments are exemplified within a 3GPP LTE context for the sake of easier understanding, but the invention is not limited to that Radio Access Technology (RAT). Other RATs, such as any of the commonly used technologies for public land mobile networks, may benefit from the invention in a similar way.

Figure 3:
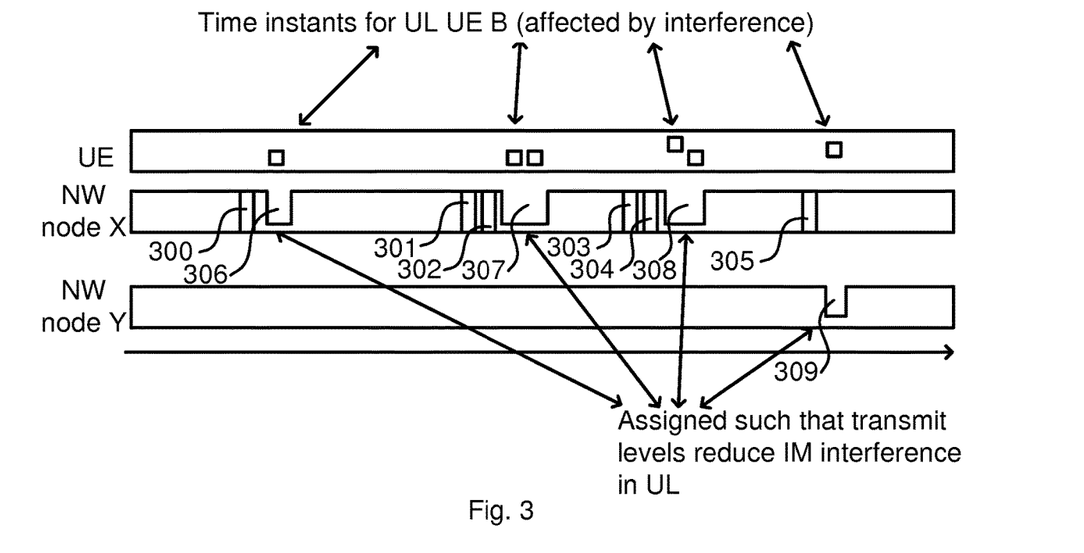
FIG. 3 is a signal scheme illustrating an approach of handling interference caused by inter-modulation in a network node for wireless communication.
Figure 4:
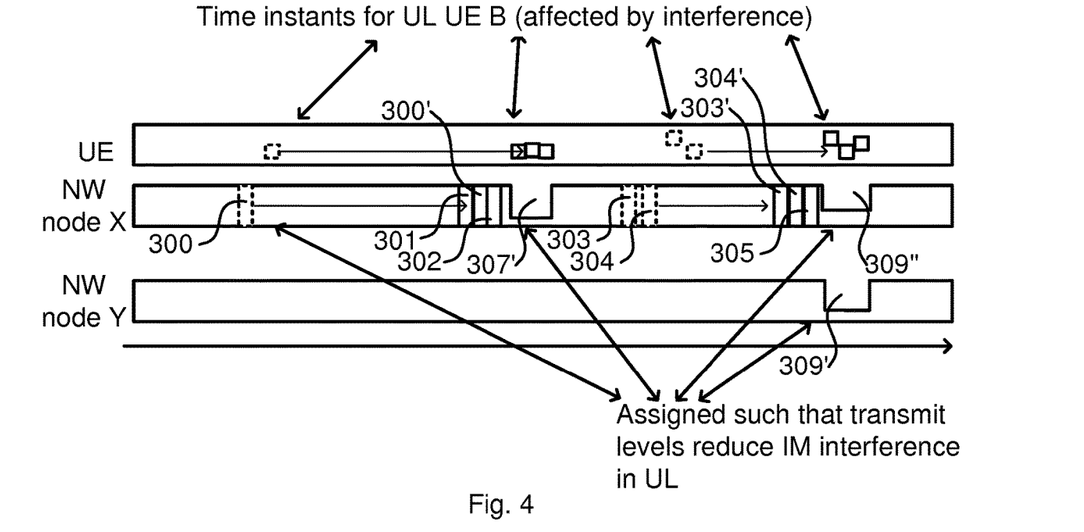
FIG. 4 is a signal scheme illustrating an approach of handling interference caused by inter-modulation in a network node for wireless communication with reduced number of occasions for limited transmissions according to an embodiment.

FIGS. 3 and 4 show principal sketches for understanding different embodiments of the invention. FIG. 3 illustrates a case where a transmit, (TX), interferer is originating from intermodulation between transmissions of the serving NW node, NW node X and a NW node of another operator, NW node Y, located on a same NW node site. In this case, consider that the NW node X has detected at least one user equipment, UE, being affected by inter-modulation interference, e.g. passive inter-modulation, PIM, interference. The transmitter of NW node X, once an uplink, UL, grant 300-305 is transmitted valid for a certain transmission time interval, TTI, limits transmissions, e.g. reduces the TX power for the carrier and/or limits the transmitted content, e.g. only necessary signals such as Control Channel (CCH)/

Common Reference Signal (CRS)/Synchronization Signal (SS) are transmitted, or omits transmission. This limited transmission is illustrated by the recesses 306-308 of the graph for NW node X. Interaction between the NW nodes X and Y may be performed such that limited transmission is applied by NW node Y, as is illustrated by recess 309 in the graph for NW node Y.

FIG. 4 shows adaptation of timing according to an embodiment where the same scenario as in FIG. 3 is contemplated. Here, the uplink grant 300 is moved to instead be transmitted as an adapted transmission grant 300' grouped together with transmission grants 301 and 302. Similar applies for transmission grants 303 and 304, which are moved and instead transmitted as transmission grants 303' and 304' grouped together with transmission grant 305. Instead of limited transmissions 306-309 as illustrated in FIG. 3, limited transmissions 307', 309' and 309" are applied. Here, 309' and 309" are illustrated to show that limited transmissions may be applied at both NW node X and NW node Y where desired and possible. Thus, limited transmission occurs at fewer times. Since some guard times normally are applied for assigning the limited transmissions, which may be the same for one and for many UL transmissions, the overall system performance may be improved since less resource is consumed for limiting the transmissions by the grouping of UL transmissions likely to be affected by inter-modulation. Details on how this is accomplished will be demonstrated below.

Figure 5:
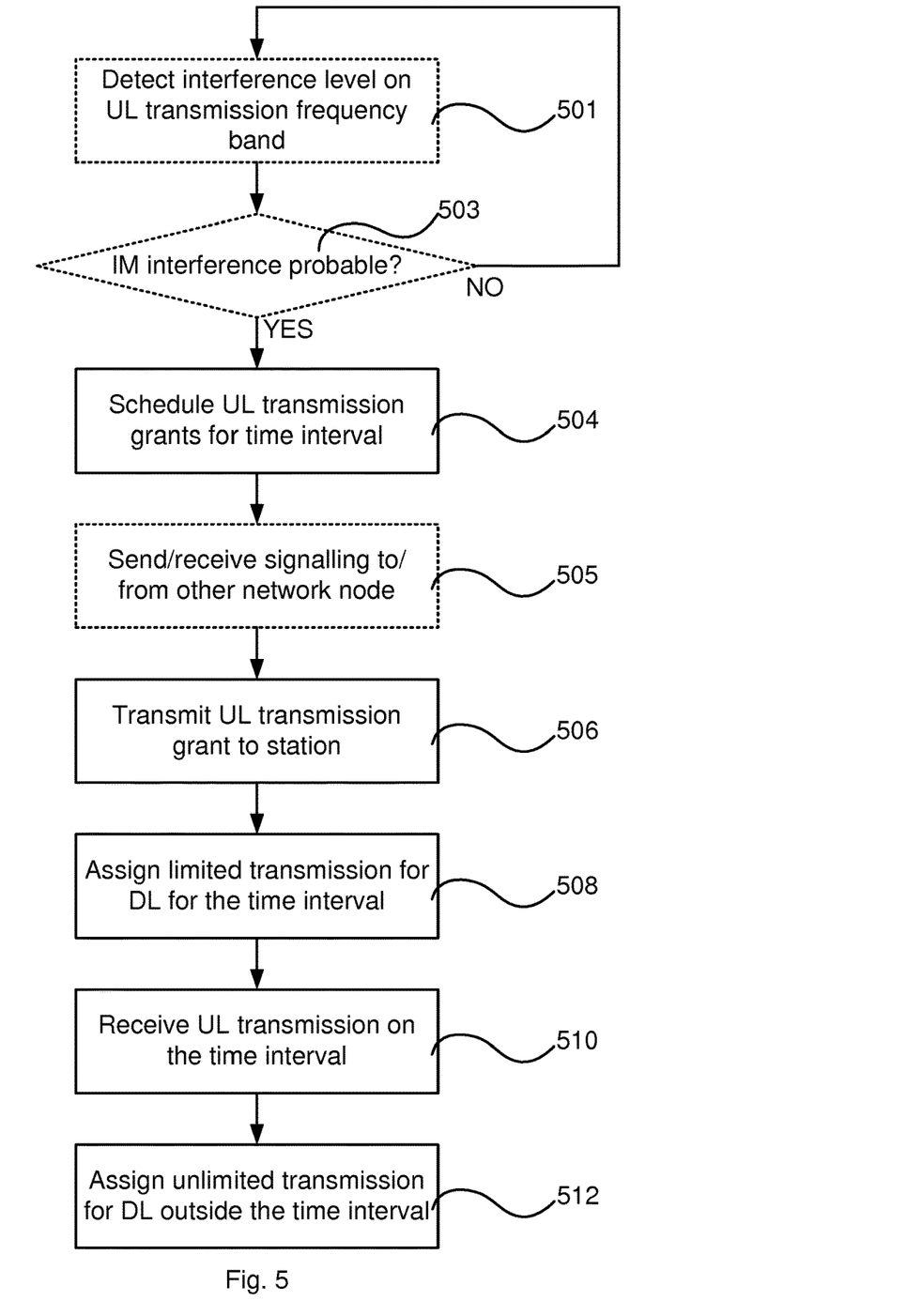
FIG. 5 is a flow chart illustrating a method of handling interference caused by inter-modulation in a network node for wireless communication according to an embodiment.

FIG. 5 is a flow chart illustrating a method according to some embodiments. The determination whether there is probable inter-modulation is not the core of this disclosure in which it is assumed that there is an inter-modulation issue. However, optionally, an interference level for an uplink carrier frequency band is detected and determined 501. The interference level may not always be caused by inter-modulation since there may be many causes of interference. Further optionally, the probability for the determined interference being caused by inter-modulation is therefore checked 503. This may be made based on knowledge about different circumstances. This probability may be determined from performance figures of a NW node or NW node site. For example, the determining may be based on statistics of the NW node where interference, i.e. possible inter-modulation issues, for UL transmissions on one or more carrier frequency bands may be checked against statistics on DL transmission load on one or more carrier frequency bands. From this, the determination may be made for example by correlating the UL statistics with the DL load statistics. If the inter-modulation interference is not the probable cause of interference, the method proceeds without taking any actions against inter-modulation interference and may return to check again, e.g. periodically. If the inter-modulation interference is the probable and substantial cause of interference, the method proceeds with handling the inter-modulation issue. The network node schedules 504 an UL grant for a TTI to the UE or set of UEs that is affected by the probable inter-modulation issues. This UL grant is valid for a future TTI. The UL grant is transmitted 506 to the UE and the NW node controls its transmissions, as indicated with reference to FIGS. 3 and 4, by assigning 508 a DL transmit level for a time interval comprising the second TTI where it limits DL transmissions, e.g. reduces the TX power, only necessary signals such as Control Channel (CCH)/Common Reference Signal (CRS)/Synchronization Signal (SS) are transmitted, and possibly at lower TX power than nominal, or omitting DL transmissions during the time interval. The network node then receives 510 UL transmissions on the assigned TTI, wherein the inter-modulation interference hopefully is reduced by the limited DL transmissions such that the UL transmissions can be properly received.

The above demonstrated approach is based on, when it is determined that one or more UEs are affected by probable inter-modulation issues, handling them as described above by limiting DL transmissions at time intervals of UL communication. However, consider that inter-modulation issues are determined for one or some UEs based on high interference that seems probable to emanate from inter-modulation. The issues may also be present for UEs that the NW node not has been able to determine interference and it probable cause for, e.g. due to too high interference. For this kind of issue, the NW node may, when inter-modulation issues are determined to be probable for some UEs, perform the similar approach as above but for a general set of UEs.

The scheduling 504 includes, when inter-modulation is considered present, to assign uplink transmission grants for a plurality of stations of a subset of the stations within a time interval, such that scheduling outside the time interval is reduced. The uplink transmission grants are valid for a future TTI, which is chosen to be within the time interval. In order to collect UL transmissions at few time intervals, the scheduling 504 comprises adapting a schedule for one or more stations, where possible, to fall within the time interval. A scheduler performing the scheduling 504 may thus be arranged to determine which UL grants that may be adapted, e.g. by delaying the UL grants, and which cannot be adapted or only be very slightly adapted and thereby grouping the UL grants. The term "UL grant" is here used to denote general procedure for allocating UL resources. An example of this procedure comprises assignment of random access channel (RACH) preambles, for non-contention based random access, to avoid preamble collision. The nature of the RACH preambles put some constraints. For example for RACH preamble assignments, there is a limit on how many that may be grouped which is limited by the number of dedicated RACH preambles that are available. For example, there may be 64 preamble patterns for distinguishing between RACH preamble sequences. Further, regarding RACH transmissions, the NW node is only able to control the timing of RACH transmission in non-contention random access procedure, and only to the extent that it can be estimated a likely time for RACH transmissions to occur after a random access preamble assignment sent by the NW node. For paging of UEs, the scheduler need to respect paging occasions where the UE has specific time windows when it wakes up and listens for paging messages. In that case, the NW node may delay a paging message to one of following paging occasions. Delay requirements for different services will also be considered. Furthermore, here the NW node is discussed as a general NW node. For example in handover procedure, it may not be the same NW node that receives the UL transmission as the one transmitting the random access preamble assignment, i.e. a source NW node transmits the random access preamble assignment and a target NW node receives the RACH transmission from the UE. This will be further discussed with reference to FIGS. 6 and 7.

According to some embodiments, at least some of the TTIs where inter-modulation reducing measures as demonstrated above has been taken may be chosen by the scheduler among a subset of TTIs where possible random access channel, RACH, transmission is allocated. This may provide the advantage that at least some of the RACH occasions may be unaffected by inter-modulation interference.

An UL transmission grant is transmitted 506 to the UE and limited transmission is assigned 508 for the time interval according to the scheduling 504. The UL transmission is then enabled to be received 510 during the time interval with lower inter-modulation interference. In case another NW node is involved, the procedure may include sending and/or receiving signalling 505 to/from the another NW node, wherein the application of the assigned 508 limited transmission and/or the receiving 510 may be performed in the NW node transmitting 506 the UL transmission grant or in another NW node. When outside the scheduled 504 time interval, DL transmissions are performed 512 in a normal way, i.e. without the limitations discussed above.

Figure 6:
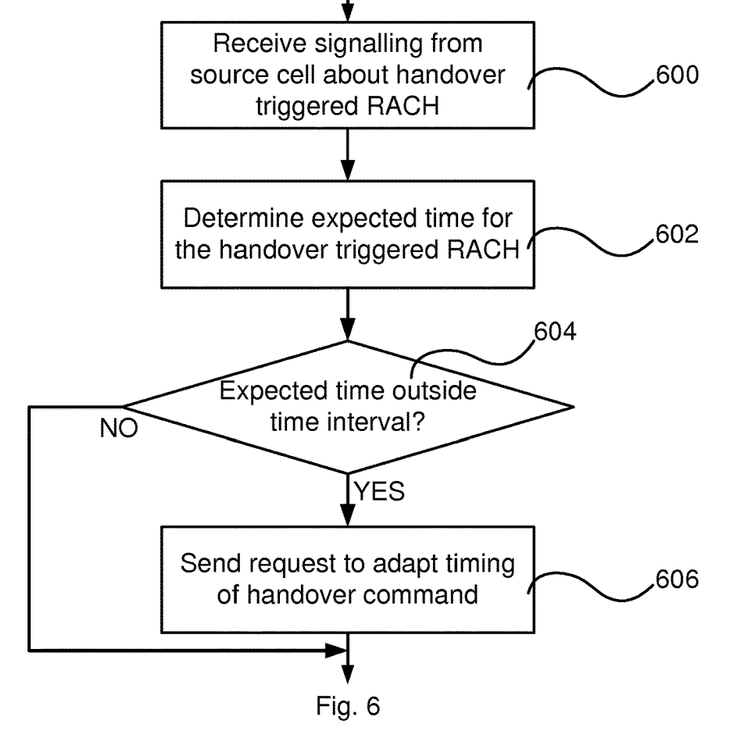
FIGS. 6 and 7 are flow charts illustrating interaction between network nodes according to embodiments for reducing number of occasions of limited transmissions.
Figure 7:
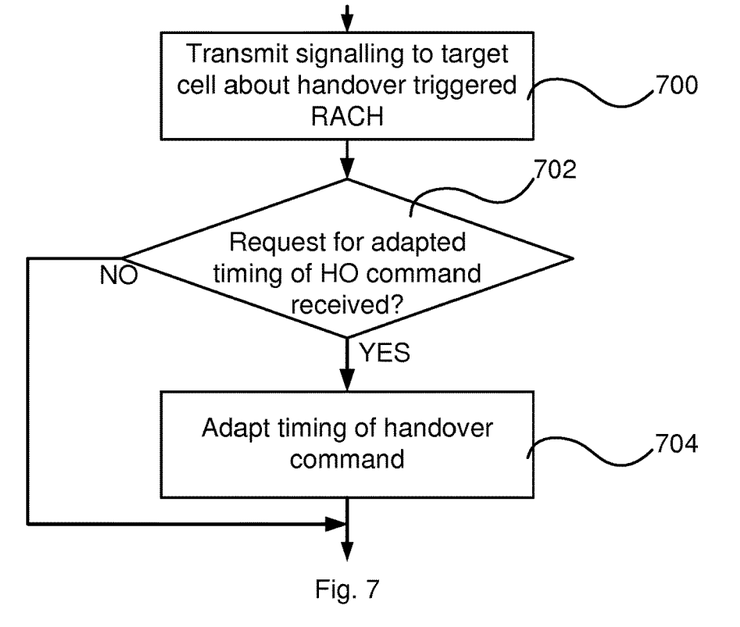

FIGS. 6 and 7 are flow charts illustrating interaction between network nodes according to embodiments for reducing number of occasions of limited transmissions at handover. FIG. 6 illustrates actions at a target NW node and FIG. 7 illustrates actions at a source NW node.

A target NW node receives 600, e.g. via a core network, signalling about handover triggered RACH from a source NW node. The target NW node determines 602 the expected time for the handover triggered RACH and checks 604 if the expected time fits within a time interval that is scheduled or is to be scheduled for limited transmissions. If the expected time fits, the target NW node just proceeds with its scheduling but if there is issues with scheduling limited transmissions time interval, the target node sends 606 a request to the source node to adapt timing of a handover command such that scheduling of limited transmissions time interval will fit to an expected time for handover triggered RACH.

A source NW node transmits 700, e.g. via a core network, signalling about handover triggered RACH to a target NW node. The source node checks 702 whether there is any received request about adapted timing of handover command from the target NW node. If no such request is received, the procedure just continues. If there is such a received request, the source NW node adapts 704 timing, if possible, of the handover command according to the received request and proceeds with the procedure.

Figure 8:
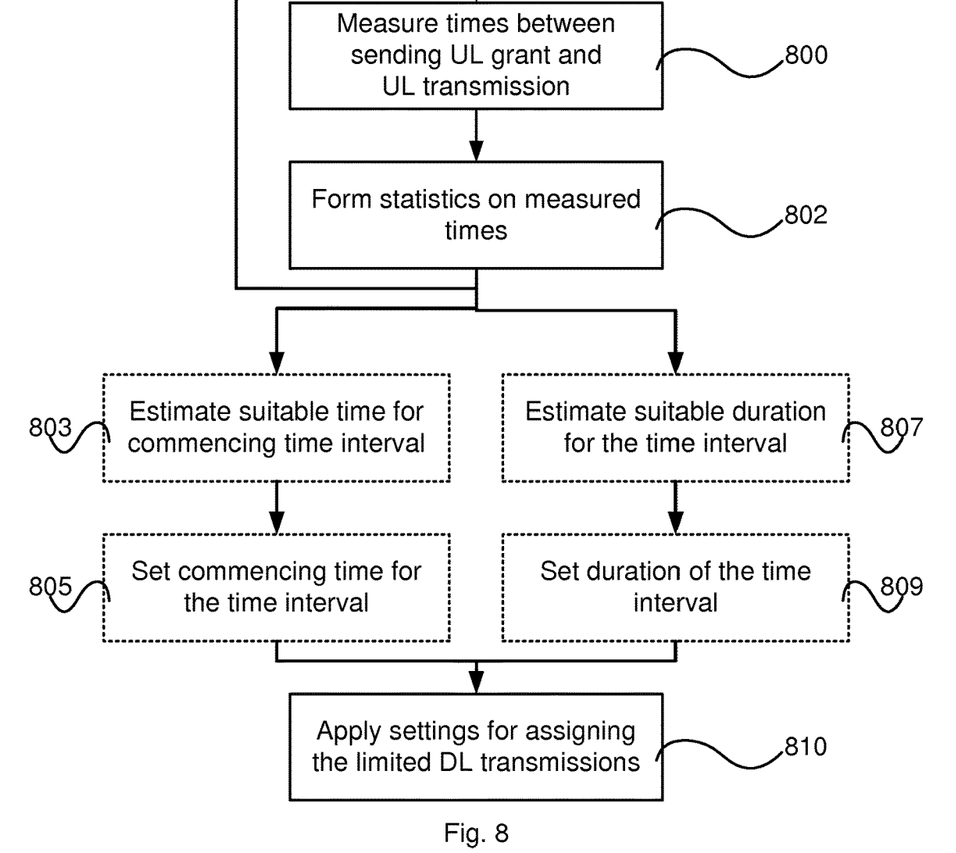
FIG. 8 is a flow chart illustrating an approach for determining timing parameters for limited transmissions.

FIG. 8 is a flow chart illustrating an approach for determining timing parameters for limited transmissions. The time between an UL transmission grant and the UL transmission may not be deterministic. Similar, the necessary time for the UL transmission may not be exactly known in advance. Since it is a desire not to start the time interval too early or too late and also keeping in short for not degrading system performance, these uncertainties may be dealt with to improve system performance. This may be made by collecting statistics on transmissions and base scheduling on the statistics to achieve efficient inter-modulation handling, at least most of the time. This is performed by measuring 800 time between sending UL grant and UL transmission and forming 802 statistics thereon. This may be an ongoing procedure, as indicated by arrow from the forming step 802 to the measuring step 800, for populating the statistics with data.

From the statistics and knowledge about when an UL transmission grant will be or has been sent, a suitable time for commencing the time interval may be estimated 803. Based on this estimate, a commencing time for the time interval may be set 805, wherein a guard time may be assigned, in relation to an UL transmission grant. From the statistics and knowledge about when a last UL transmission grant of a group will be or has been sent, a suitable time for ending the time interval may also be estimated, wherein a suitable duration of the time interval may be estimated 807. Based on this estimate, a duration of the time interval may be set 809, wherein a guard time may be assigned. From one or more of these estimations and settings, the scheduler may apply 810 commencing time and/or duration of the time interval for limited DL transmissions.

Figure 9:
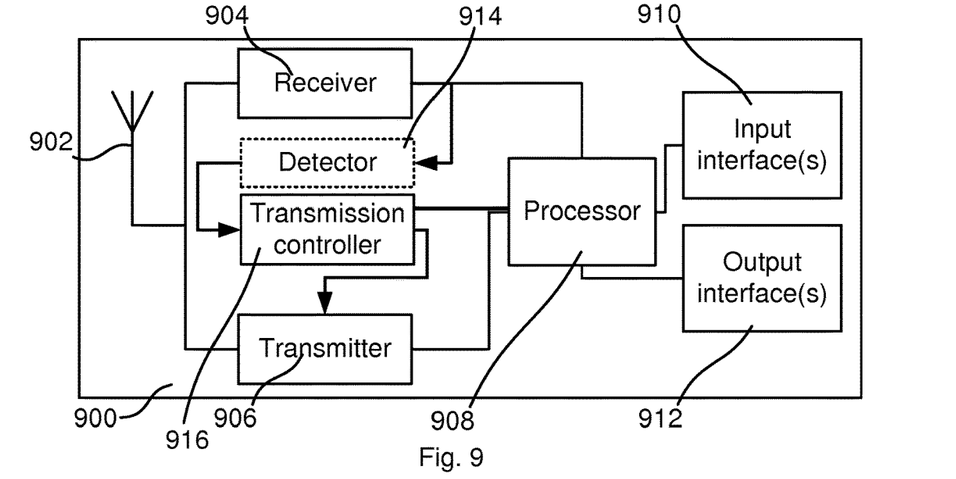
FIG. 9 is a block diagram schematically illustrating a network node according to an embodiment.

FIG. 9 is a block diagram schematically illustrating a NW node 900 according to an embodiment. The NW node 900 comprises an antenna arrangement 902, a receiver 904 connected to the antenna arrangement 902, a transmitter 906 connected to the antenna arrangement 902, a processing element 908 which may comprise one or more circuits, one or more input interfaces 910 and one or more output interfaces 912. The interfaces 910, 912 can be user interfaces and/or signal interfaces, e.g. electrical or optical. For example, the interfaces 910, 912 may comprise connection interfaces to a core network associated with the NW node 900. The NW node 900 is arranged to operate in a cellular communication network, e.g. as a base station operating a cell. In particular, by the processing element 908 being arranged to perform the embodiments demonstrated with reference to FIGS. 2 to 8, the NW node 900 is capable of handling inter-modulation interference issues. The processing element 908 can also fulfill a multitude of tasks, ranging from signal processing to enable reception and transmission since it is connected to the receiver 904 and transmitter 906, executing applications, controlling the interfaces 910, 912, etc.

The NW node 900 may comprise an interference level detector 914 arranged to detect an interference level on the uplink carrier frequency band for a subset of stations of the set of stations. The interference level detector 914 may thus be connected to the receiver 904 to be able to gain levels and information for performing its task. The interference level detector 914 is illustrated as a separate functional element, but may be implemented within the processing element 908 in some embodiments. This will be further demonstrated with reference to FIG. 12. The NW node 900 further comprises a transmission controller 916 arranged to apply limited transmissions during the time interval, as discussed above. The interference level detector 914 and controller may thus be considered to perform the optional steps 500 and 502 of FIG. 5 to determine whether inter-modulation issues exist. The transmission controller 916 is further arranged to, if the interference level indicates probable inter-modulation interference, schedule uplink transmission grants for a plurality of stations of a subset of the stations within a time interval, such that scheduling outside the time interval is reduced. The uplink transmission grants are valid for the time interval. By adapting a schedule for at least one station of the plurality of stations of the subset of the stations to fall within the time interval, UL transmissions may be grouped to limit the number of time intervals with reduced transmissions. The transmission controller 916 causes the transceiver to transmit the uplink transmission grant to the plurality of stations of the subset of stations at scheduled times, and assigns limited transmissions on the downlink carrier frequency band at the time interval such that inter-modulation interference is reduced on the uplink carrier frequency band during the time interval. When outside the time interval, the transmission controller 916 assigns transmissions on the downlink carrier frequency band with less limitations than during the time interval, e.g. according to normal operation for a legacy NW node. The transmission controller 916 can thus be considered to also perform the tasks of steps 504 and 508 of FIG. 5. The controller 916 is illustrated as a separate functional element, but may be implemented within the processing element 908 in some embodiments. This will be further demonstrated with reference to FIG. 12.

Figure 10:
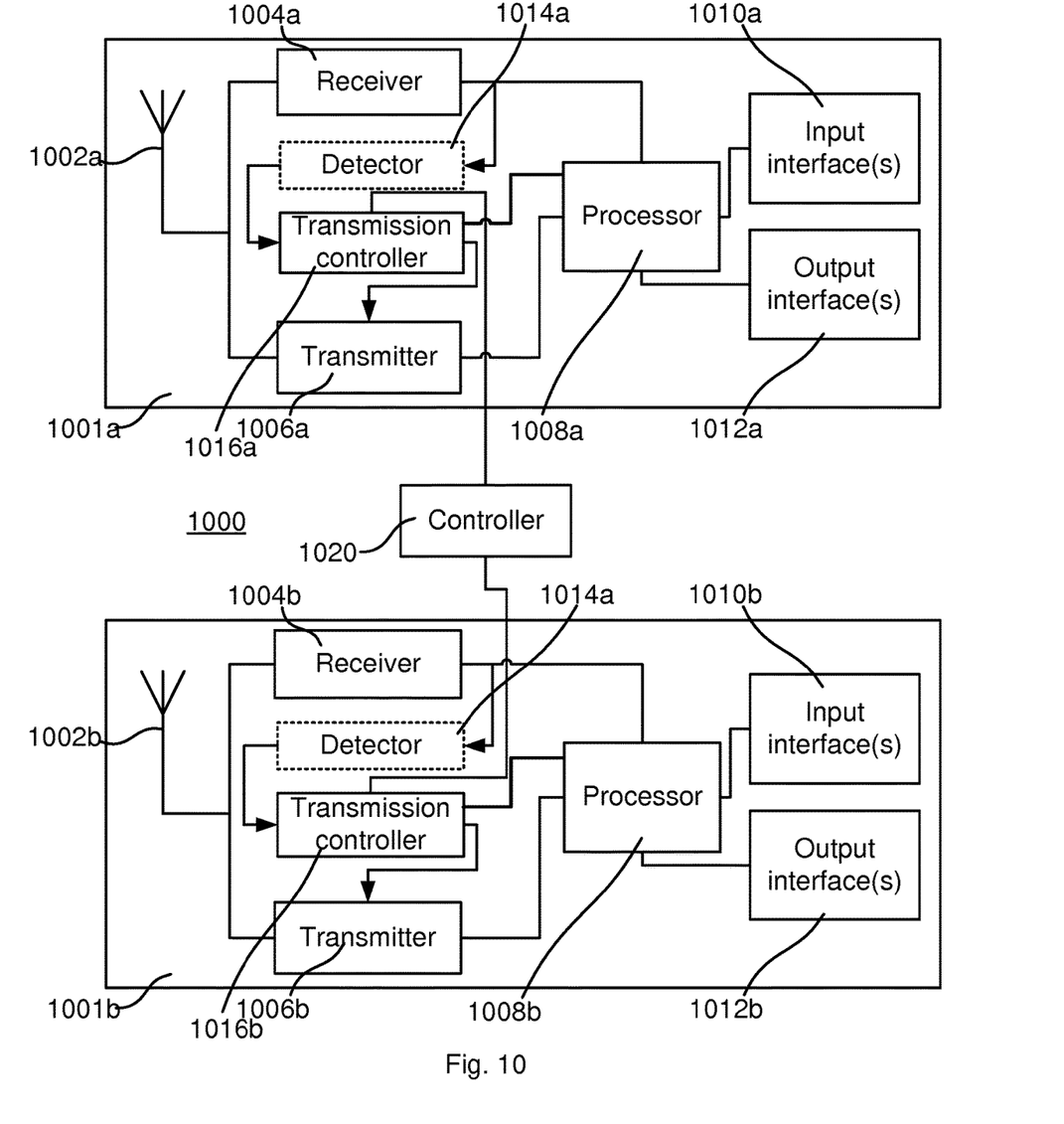
FIG. 10 is a block diagram schematically illustrating a network node site according to an embodiment.

FIG. 10 is a block diagram schematically illustrating a NW node site 1000 according to an embodiment. The NW node site 1000 comprises two or more co-located NW nodes 1001*a*, 1001*b* and a NW node site controller 1020. The NW nodes 1001*a*, 1001*b* resembles the NW node 700 demonstrated with reference to FIG. 9. That is, the NW nodes 1001*a*, 1001*b* each comprises an antenna arrangement 1002*a*, 1002*b*, a receiver 1004*a*, 1004*b* connected to the antenna arrangement 1002*a*, 1002*b*, a transmitter 1006*a*, 1006*b* connected to the antenna arrangement 1002*a*, 1002*b*, a processing element 1008*a*, 1008*b* which may comprise one or more circuits, one or more input interfaces 1010*a*, 1010*b* and one or more output interfaces 1012*a*, 1012*b*. The interfaces 1010*a*, 1010*b*, 1012*a*, 1012*b* can be user interfaces and/or signal interfaces, e.g. electrical or optical. For example, the interfaces 1010*a*, 1010*b*, 1012*a*, 1012*b* may comprise connection interfaces to a core network associated with the respective NW node 1001*a*, 1001*b*. The NW nodes 1001*a*, 1001*b* may be arranged to operate in a cellular communication network, e.g. as a base station operating a cell. The processing element 1008*a*, 1008*b* can also fulfill a multitude of tasks, ranging from signal processing to enable reception and transmission since it is connected to the receiver 1004*a*, 1004*b* and transmitter 1006*a*, 1006*b*, executing applications, controlling the interfaces 1010*a*, 1010*b*, 1012*a*, 1012*b*, etc. The NW nodes 1001*a*, 1001*b* each may comprise an interference level detector 1014*a*, 1014*b* arranged to detect an interference level on the uplink carrier frequency band for a subset of stations of the set of stations. The interference level detector 1014*a*, 1014*b* is thus connected to the receiver 1004*a*, 1004*b* to be able to gain levels and information for performing its task. The optional interference level detectors 1014*a*, 1014*b* are illustrated as separate functional elements, but may be implemented within the processing element 1008*a*, 1008*b* or in the common NW node site controller 1020 in some embodiments. The NW nodes 1001*a*, 1001*b* may further each comprise a transmission controller 1016*a*, 1016*b* arranged to apply limited transmissions during the time interval, as discussed above. The interference level detector 1014*a*, 1014*b* and transmission controller 1016*a*, 1016*b* may thus be considered to perform the optional steps 500 and 502 of FIG. 5 to determine whether inter-modulation issues exist. The transmission controller 1016*a*, 1016*b* is further arranged to, if the interference level indicates probable inter-modulation interference, schedule uplink transmission grants for a plurality of stations of a subset of the stations within a time interval, such that scheduling outside the time interval is reduced. The uplink transmission grants are valid for the time interval. By adapting a schedule for at least one station of the plurality of stations of the subset of the stations to fall within the time interval, UL transmissions may be grouped to limit the number of time intervals with reduced transmissions. The transmission controller 1016*a*, 1016*b* causes the transceiver to transmit the uplink transmission grant to the plurality of stations of the subset of stations at scheduled times, and assigns limited transmissions on the downlink carrier frequency band at the time interval such that inter-modulation interference is reduced on the uplink carrier frequency band during the time interval. When outside the time interval, the transmission controller 1016*a*, 1016*b* assigns transmissions on the downlink carrier frequency band with less limitations than during the time interval, e.g. according to normal operation for a legacy NW node. The interference level detectors 1014*a*, 1014*b* and/or controllers 1016*a*, 1016*b* may alternatively be considered to be more or less only interfaces towards the NW node site controller 1020 which may perform the activities and the interference level detectors 1014*a*, 1014*b* are interfaces towards the receivers 1004*a*, 1004*b* for collecting signals to work on, and the controllers 1016*a*, 1016*b* are interfaces towards the transmitters 1005*a*, 1006*b* to control the reduced transmissions. Alternatively, the NW node site controller 1020 may be considered to be more or less only an interface between interference level detectors 1014*a*, 1014*b* and controllers 1016*a*, 1016*b*, which may perform the activities and exchange necessary information via the NW node site controller 1020, i.e. the functions of the NW node site controller 1020 is distributed wherein the NW node site controller 1020 per se, at least partially, may be regarded as distributed, e.g. between interference level detectors 1014*a*, 1014*b* and controllers 1016*a*, 1016*b*, or processing elements 1008*a*, 1008*b*.

In the following, the functions related to inter-modulation interference handling will be described from the point of view that a first NW node 1001*a* transmits a DL signal which may interfere with an UL signal to a second NW node 1001*b*. This applies of course the other way too, but for the sake of brevity, the explanation is made from the above referenced point of view wherein the skilled reader readily understands how it will work both ways.

The second NW node 1001*b* may be arranged to detect an interference level on a transmission received on an associated uplink carrier frequency band for a subset of stations or UEs of a set of stations or UEs associated with the second NW node 1001*b*. The NW node site controller 1020 may be arranged to determine whether the interference level indicates probable inter-modulation interference. If the interference level indicates probable inter-modulation interference, the second NW node 1001*b* is arranged to schedule an UL transmission grant for at least one of the stations of the subset of stations associated with the second NW node 1001*b* by control from the NW node site controller 1020. The UL transmission grant is valid for a future TTI, and transmit the UL transmission grant to the at least one station of the subset of stations associated with the second NW node 1001*b*. The first NW node 1001*a* is arranged to assign a limited transmission during a time interval comprising the future TTI, by control from the NW node site controller 1020, on a DL carrier frequency band of the first NW node 1001*a* that has a frequency relation to the UL carrier frequency band on which the interference level indicated probable inter-modulation such that inter-modulation interference is reduced on the UL carrier frequency band associated with the second NW node 1001*b*.

Figure 11:
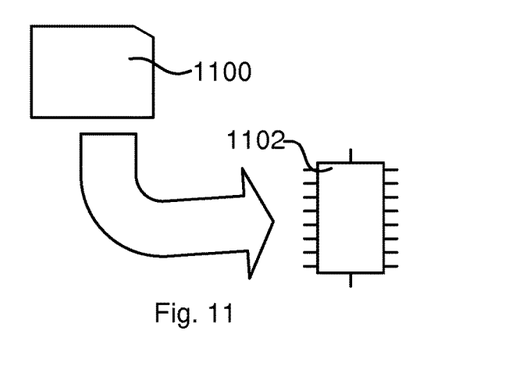
FIG. 11 schematically illustrates a computer-readable medium and a processing device.

The methods according to the present invention is suitable for implementation with aid of processing means, such as computers and/or processors, especially for the case where the processing elements demonstrated above comprises a processor handling interference caused by inter-modulation in a network node for wireless communication capable of communication with a set of stations for wireless communication, as demonstrated above. The processing element may for example be any one of the processing elements 908, 914, 916, 1008*a*, 1008*b*, 1014*a*, 1014*b*, 1016*a*, 1016*b* and 1020 demonstrated with reference to FIGS. 9 and 10 above, or a combination of the processing elements as also has been demonstrated with reference to respective FIGS. 9 and 10. Therefore, there is provided computer programs, comprising instructions arranged to cause the processing means, processor, or computer to perform the steps of any of the methods according to any of the embodiments described with reference to FIGS. 2 to 8. The computer programs preferably comprises program code which is stored on a computer readable medium 1100, as illustrated in FIG. 11, which can be loaded and executed by a processing means, processor, or computer 1102 to cause it to perform the methods, respectively, according to embodiments of the present invention, preferably as any of the embodiments described with reference to FIGS. 2 to 8. The computer 1102 and computer program product 1100 can be arranged to execute the program code sequentially where actions of the any of the methods are performed stepwise, or perform the actions on a real-time basis. The processing means, processor, or computer 1102 is preferably what normally is referred to as an embedded system. Thus, the depicted computer readable medium 1100 and computer 1102 in FIG. 11 should be construed to be for illustrative purposes only to provide understanding of the principle, and not to be construed as any direct illustration of the elements.

Figure 12:
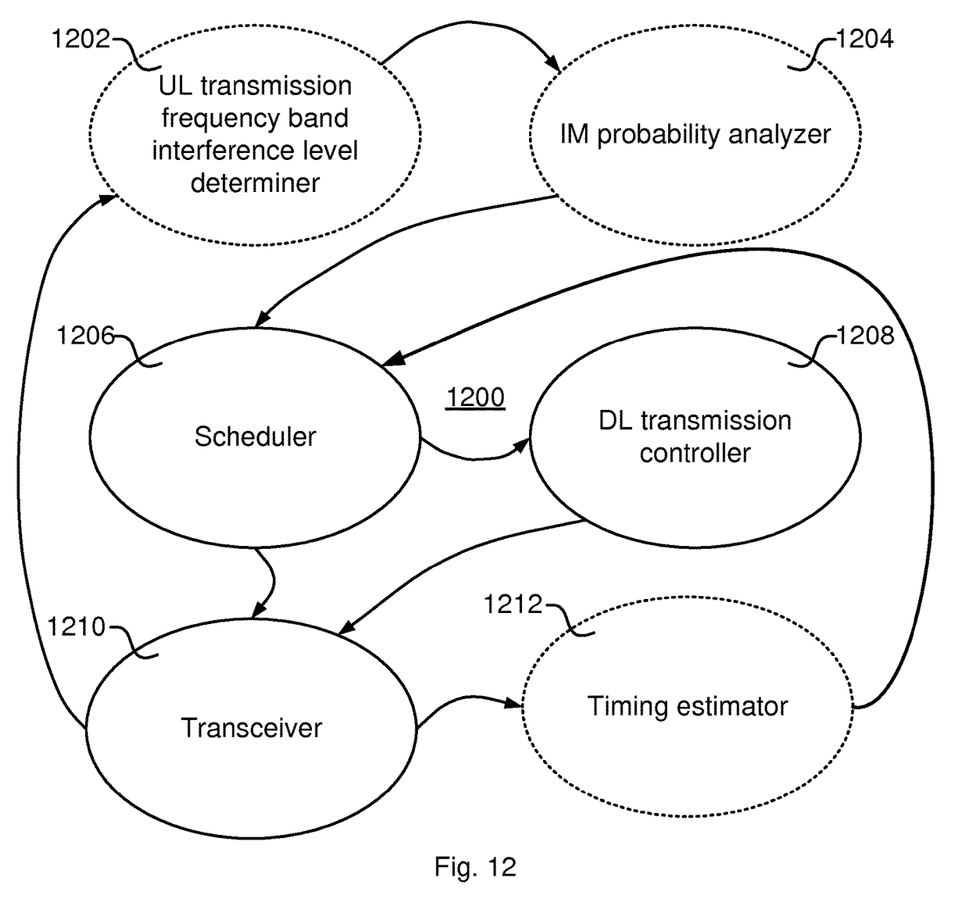
FIG. 12 schematically illustrates functional elements for handling interference caused by inter-modulation in a network node for wireless communication according to an embodiment

FIG. 12 schematically illustrates functional elements for handling interference caused by inter-modulation in a NW node or NW node site for wireless communication according to an embodiment. The technology demonstrated above is suitably implemented as a combination of software and hardware, where the software parts may be performed at one dedicated processor or distributed between two or more processors, which sometimes may belong to different entities, e.g. between NW nodes of a NW node site. FIG. 12 therefore describes an apparatus 1200 from a functional point of view where the distribution between processors is arbitrary. The apparatus 1200, which may be a NW node or a NW node site as demonstrated with reference to FIGS. 9 and 10, may comprise an optional UL carrier frequency band interference level determiner 1202, which based on input from a transceiver 1210 determines an interference level for an UL carrier frequency band. The determined interference level may be provided to an optional inter-modulation probability analyser 1204 which determined whether interference is caused by inter-modulation, as demonstrated above. The inter-modulation analyser 1204 provides information whether the interference is caused by inter-modulation to a scheduler 1206 which schedules UL grants for a future TTI, e.g. based on a timing estimator 1212 collecting statistics and providing settings for time interval commencement and/or time interval duration, as demonstrated above, provides the UL grants and schedule for transmitting it to the transceiver 1210 which transmits accordingly to one or more UEs, as also demonstrated above. The scheduler 1206 also provides information about the scheduled UL grant for the future TTI to a DL transmission controller 1208, which takes measures for reducing DL transmission at a time interval comprising the future TTI, i.e. to make a limited transmission, e.g. to transmit only necessary signals such as Control Channel (CCH)/Common Reference Signal (CRS)/Synchronization Signal (SS) are transmitted, and possibly at lower TX power than nominal. The DL transmission controller 1208 then provides information about that to the transceiver 1210, which then transmits according to the limited transmission approach, e.g. only the necessary signals and/or at lower TX power than nominal during the time interval comprising the future TTI.

The invention claimed is:

1. A method of handling interference caused by inter-modulation in a network node, for wireless communication, capable of communication with a set of stations for the wireless communication, wherein the stations are wireless transceiver devices and communication from the network node to any of the stations is considered to be downlink communication performed on a downlink carrier in a downlink carrier frequency band and communication from any of the stations is considered to be uplink communication performed on an uplink carrier in an uplink carrier frequency band, the method comprising, when an interference level indicates probable inter-modulation interference:

determining expected time for a handover triggered random access channel (RACH);

determining if the expected time fits within a time interval associated with uplink transmissions;

scheduling, based on the determination that the expected time fits within the time interval, uplink transmission grants for a plurality of stations of a subset of the stations within the time interval, such that scheduling outside the time interval is reduced, wherein the uplink transmission grants are valid for the time interval, by adapting a schedule for at least one station of the plurality of stations of the subset of the stations to fall within the time interval;

transmitting the uplink transmission grants to the plurality of stations of the subset of the stations;

assigning limited transmissions on the downlink carrier frequency band at the time interval such that inter-modulation interference is reduced on the uplink carrier frequency band during the time interval, wherein assigning the limited transmissions on the downlink carrier frequency band comprises transmitting only system information at a reduced power than nominal power; and assigning transmissions on the downlink carrier frequency band outside the time interval with less limitations than during the time interval.

2. The method of claim 1, further comprising receiving, over a core network associated with the network node, signalling from a network node of a source cell about the expected time for the handover triggered RACH.

3. The method of claim 2, further comprising:

sending, over the core network, a request to adapt timing of a handover command to the network node of the source cell when the expected time for the handover triggered RACH falls outside the time interval such that the handover triggered RACH falls within the time interval.

4. The method of claim 1, wherein at least one of the uplink transmission grants is a RACH preamble assignment and the uplink transmissions comprise RACH transmissions.

5. The method of claim 4, wherein timing of a RACH transmission is controlled based on an estimate made for the RACH transmission to occur after the RACH preamble assignment.

6. The method of claim 1, wherein at least one of the uplink transmission grants is a RACH request.

7. The method of claim 1, wherein the scheduling of the uplink transmission grants by adapting the schedule comprises delaying at least one paging of a station.

8. The method of claim 1, further comprising setting a time between transmitting an uplink transmission grant from the uplink transmission grants and the time when the time interval commences.

9. The method of claim 8, further comprising:

measuring times between transmitting the uplink transmission grants and the corresponding uplink transmissions;

forming statistics on the measured times; and estimating a suitable time for commencing the time interval and/or duration of the time interval based on the statistics such that the uplink transmissions are likely to fall within the time interval, wherein the setting of the time when the time interval commences and/or of the duration of the time interval is based on the estimate.

10. The method of claim 1, further comprising setting a duration of the time interval.

11. The method of claim 1, further comprising receiving the uplink transmissions from the plurality of stations of the subset of the stations during the time interval.

12. A network node for wireless communication capable of communication with a set of stations for the wireless communication, wherein the stations are wireless transceiver devices and communication from the network node to any of the stations is considered to be downlink communication performed on a downlink carrier in a downlink carrier frequency band and communication from any of the stations is considered to be uplink communication performed on an uplink carrier in an uplink carrier frequency band, the network node comprising:
- a transceiver arranged to perform the uplink and downlink communications with the stations; and
- a transmission controller arranged to, when an interference level indicates probable inter-modulation interference:
  - determine expected time for a handover triggered random access channel (RACH);
  - determine if the expected time fits within a time interval associated with uplink transmissions;
  - schedule, based on the determination that the expected time fits within the time interval, uplink transmission grants for a plurality of stations of a subset of the stations within the time interval, such that scheduling outside the time interval is reduced, wherein the uplink transmission grants are valid for the time interval, by adapting a schedule for at least one station of the plurality of stations of the subset of the stations to fall within the time interval;
  - cause the transceiver to transmit the uplink transmission grants to the plurality of stations of the subset of the stations;
  - assign limited transmissions on the downlink carrier frequency band at the time interval such that inter-modulation interference is reduced on the uplink carrier frequency band during the time interval, wherein to assign the limited transmissions on the downlink carrier frequency band, the transmission controller is arranged to transmit only system information at a reduced power than nominal power; and
  - assign transmissions on the downlink carrier frequency band outside the time interval with less limitation than during the time interval.

13. The network node of claim 12, wherein the transmission controller is further arranged to receive, over a core network associated with the network node, signalling from a network node of a source cell about the expected time for the handover triggered RACH.

14. The network node of claim 13, wherein the transmission controller is further arranged to:
- send, over the core network, a request to adapt timing of a handover command to the network node of the source cell when the expected time for the handover triggered RACH falls outside the time interval such that the handover triggered RACH falls within the time interval.

15. The network node of claim 12, wherein at least one of the uplink transmission grants is a RACH preamble assignment and the uplink transmissions comprise RACH transmissions.

16. The network node of claim 12, wherein at least one of the uplink transmission grants is a RACH request.

17. The network node of claim 12, wherein the transmission controller is further arranged to delay at least one paging of a station by adapting the schedule of the uplink transmission grants.

18. The network node of claim 12, wherein the transmission controller is further arranged to set a time between transmitting an uplink transmission grant from the uplink transmission grants and the time when the time interval commences.

19. The network node of claim 18, further comprising a timing estimator being arranged to:
- measure times between transmitting the uplink transmission grants and the corresponding uplink transmissions;
- form statistics on the measured times; and
- estimate a suitable time for commencing the time interval and/or duration of the time interval based on the statistics such that the uplink transmissions are likely to fall within the time interval, wherein the transmission controller is arranged to set the time when the time interval commences and/or of the duration of the time interval based on the estimate.

20. The network node of claim 12, wherein the transmission controller is further arranged to set a duration of the time interval.

21. A non-transitory computer-readable storage medium comprising a computer program comprising instructions which, when executed on a processor of a network node, for wireless communication, capable of communication with a set of stations for the wireless communication, cause the network node to perform a method of handling interference caused by inter-modulation in the network node, wherein the stations are wireless transceiver devices and communication from the network node to any of the stations is considered to be downlink communication performed on a downlink carrier in a downlink carrier frequency band and communication from any of the stations is considered to be uplink communication performed on an uplink carrier in an uplink carrier frequency band, the method comprising, when an interference level indicates probable inter-modulation interference:
- determining expected time for a handover triggered random access channel (RACH);
- determining if the expected time fits within a time interval associated with uplink transmissions;
- scheduling, based on the determination that the expected time fits within the time interval, uplink transmission grants for a plurality of stations of a subset of the stations within the time interval, such that scheduling outside the time interval is reduced, wherein the uplink transmission grants are valid for the time interval, by adapting a schedule for at least one station of the plurality of stations of the subset of the stations to fall within the time interval;
- transmitting the uplink transmission grants to the plurality of stations of the subset of the stations;
- assigning limited transmissions on the downlink carrier frequency band at the time interval such that inter-modulation interference is reduced on the uplink carrier frequency band during the time interval, wherein assigning the limited transmissions on the downlink carrier frequency band comprises transmitting only system information at a reduced power than nominal power; and assigning transmissions on the downlink carrier frequency band outside the time interval with less limitations than during the time interval.

22. A network node site comprising co-located network nodes comprising a first network node and a second network node, each for wireless communication and capable of communication with a set of stations for the wireless communication, wherein the stations are wireless transceiver devices and communication from each of the co-located network nodes to any of the respective stations is considered to be downlink communication performed on a downlink carrier in a downlink carrier frequency band and communication from any of the stations is considered to be uplink communication performed on an uplink carrier in an uplink carrier frequency band, the network node site comprising a network node site controller arranged to cause a transmission controller of at least one of the first and second network nodes to assign limited transmissions on the downlink carrier frequency band at a time interval such that inter-modulation interference caused by respective network node for any of the co-located network nodes is reduced on the uplink carrier frequency band during the time interval, wherein at least one of the first and second network nodes comprises:

a transceiver arranged to perform the uplink and downlink communications with the stations; and the transmission controller arranged to, when an interference level indicates probable inter-modulation interference:

determine expected time for a handover triggered random access channel (RACH);

determine if the expected time fits within the time interval associated with uplink transmissions;

schedule, based on the determination that the expected time fits within the time interval, uplink transmission grants for a plurality of stations of a subset of the stations within the time interval, such that scheduling outside the time interval is reduced, wherein the uplink transmission grants are valid for the time interval, by adapting a schedule for at least one station of the plurality of stations of the subset of the stations to fall within the time interval;

cause the transceiver to transmit the uplink transmission grants to the plurality of stations of the subset of the stations;

assign limited transmissions on the downlink carrier frequency band at the time interval such that the inter-modulation interference is reduced on the uplink carrier frequency band during the time interval, wherein to assign the limited transmissions on the downlink carrier frequency band, the transmission controller is arranged to transmit only system information at a reduced power than nominal power; and assign transmissions on the downlink carrier frequency band outside the time interval with less limitation than during the time interval.

23. The network node site of claim 22, wherein the co-located network nodes share the network node site controller, and wherein the co-located network nodes are arranged to exchange, via the network node site controller, information on interference levels which indicate the probable inter-modulation interference and time intervals for limited transmissions on the downlink carrier frequency band.

24. The network node site of claim 22, wherein the system information comprises control channel signals, reference signal or synchronization signals, or any combination thereof.

25. The network node site of claim 22, wherein communication from any of the co-located network nodes to any of the stations associated therewith is performed also on a further downlink carrier frequency band, or communication from any of the stations associated therewith is also performed on a further uplink carrier frequency band for carrier aggregation, and wherein when the interference level indicates probable inter-modulation interference also for the further uplink carrier frequency band, the limited transmissions are assigned on the downlink carrier frequency band of the one of the downlink carrier frequency bands that has a frequency relation to the one of the uplink carrier frequency bands on which the interference level indicated the probable inter-modulation interference such that the inter-modulation interference is reduced on that uplink carrier frequency band.

* * * * *